United States Patent [19]
Zorabedian

[11] Patent Number: 6,014,216
[45] Date of Patent: Jan. 11, 2000

[54] ARCHITECTURE FOR AIR-TURBULENCE-COMPENSATED DUAL-WAVELENGTH HETERODYNE INTERFEROMETER

[75] Inventor: Paul Zorabedian, Mountain View, Calif.

[73] Assignee: Hewlett-Packard Company, Palo Alto, Calif.

[21] Appl. No.: 09/227,998

[22] Filed: Jan. 8, 1999

[51] Int. Cl.[7] .................................................. G01B 9/02
[52] U.S. Cl. ........................................... 356/349; 356/361
[58] Field of Search .................................. 356/345, 349, 356/361

[56] References Cited

U.S. PATENT DOCUMENTS

| | | |
|---|---|---|
| 4,715,706 | 12/1987 | Wang . |
| 5,404,222 | 4/1995 | Lis . |
| 5,732,095 | 3/1998 | Zorabedian . |
| 5,748,313 | 5/1998 | Zorabedian . |
| 5,784,161 | 7/1998 | Bechstein . |

*Primary Examiner*—Robert H. Kim

[57] ABSTRACT

An apparatus for measuring the change in position of a stage mirror with reference to a reference mirror when the stage mirror moves between first and second positions. The apparatus includes a light source for generating first and second coincident light beams, the first light beam having a wavelength $\lambda_1$ and the second light beam having a wavelength $\lambda_2$ where $\lambda_1 = M\lambda_2$. The first light beam includes two orthogonally polarized components differing in frequency by a first beat frequency, $F_{ref}(\lambda_1)$, and the second light beam includes two orthogonally polarized components differing in frequency by a second beat frequency, $F_{ref}(\lambda_2)$, where $F_{ref}(\lambda_2) = M\, F_{ref}(\lambda_1)$, and M is an integer greater than 1. A polarization dependent beam splitter directs one of the orthogonally polarized components of each of the light beams to the reference mirror and the other of the orthogonally polarized components of each of the light beams to the stage mirror. The polarization dependent beam splitter also recombines the orthogonally polarized components after the orthogonally polarized components have been reflected by either the reference mirror or the stage mirror. The light intensities of the recombined light beams are measured in first and second detectors. The outputs of these detectors are combined to provide an optical path measurement and a correction term that corrects for the density of air along the measurement path, and hence, corrects for any turbulence in the air.

5 Claims, 1 Drawing Sheet

ARCHITECTURE FOR AIR-TURBULENCE-COMPENSATED DUAL-WAVELENGTH HETERODYNE INTERFEROMETER

FIELD OF THE INVENTION

This invention relates to interferometers, and more particularly, to distance measuring interferometers that compensate for the effects of atmospheric turbulence on interferometric measurements

BACKGROUND OF THE INVENTION

Interferometers based on laser beams are used to make highly accurate displacement measurements, such as required in the control of wafer steppers used in integrated circuit (IC) manufacturing. In a distance-measuring laser interferometer, light from a laser source is split into two beams. The reference beam is reflected from a stationary reference mirror, while the measurement beam is reflected from a moving measurement mirror. The beams are recombined at a detector. The optical intensity of the combined beams depends on the difference in optical length between the reference and measurement paths. Measurements of the optical path to an accuracy of a fraction of the wavelength of the laser are routinely obtained.

Distance-measuring interferometers are typically divided into DC and AC interferometers. In a DC interferometer, the laser emits a single frequency. Only when the measurement mirror is moving is the interference signal time-varying. When the measurement mirror is stationary, the interference signal is a constant. Unfortunately, disturbances such as laser power drift and electronic noise can be easily misinterpreted as a motion signal, especially when the measurement mirror is stationary.

In an AC interferometer, the laser emits two optical frequencies with orthogonal polarizations. The two optical frequencies differ by a small amount. One of the beams is directed along the reference path while the other is directed along the path to be measured. The frequencies are separated with a polarization-dependent beam splitter, with one frequency going to the reference mirror and the other going to the measurement mirror. When he beams are recombined, a beat frequency at the difference in optical frequencies is created. When the measurement mirror moves, the beat frequency shifts because of the Doppler shift induced by the motion. In this arrangement, the distance measurement is obtained by taking the difference of the frequency observed when the measurement mirror is moving and the frequency when both mirrors are stationary. This later frequency is obtained by directing a portion of the laser's output at an appropriate detector to generate the beat frequency. Since only the component of the noise within the frequency band between the reference beat frequency and the beat frequency observed when the mirror is moving can interfere with the signal, the effects of noise are substantially reduced in AC interferometers.

Thus, the detector generates an AC signal when the measurement mirror is stationary as well as when it is moving. It is easier to reject noise with a time-varying signal than with a constant one. Therefore, AC interferometry is more accurate than DC due to its superior ability to reject noise The distance measured by observing the above-described difference in frequencies, or by counting fringes in the case of a DC interferometer, is the difference in the optical path between the reference arm of the interferometer and the arm containing the moving mirror. In most cases, the parameter of interest is the difference in physical distance. The physical path length is the optical path length divided by the average index of refraction of the air on the path traversed by the light beams. Hence, the interferometric measurement must be corrected for the index of refraction of the air along the path. In practice, the air along the measurement path may be turbulent, particularly in the region surrounding the wafer stage of a stepper. The index of refraction depends on the local air density along the path. Hence, unless the index of refraction is known on the actual path at the time the measurement is being made, errors will be made in the conversion from optical path length to physical distance. As the feature sizes in circuits shrink, the errors resulting from air turbulence can lead to serious position-measurement errors. Hence, methods for measuring the index of refraction simultaneously with the optical path length have been proposed.

One method for simultaneously determining the density of air and the physical path length is to use the measured relationships between the index of refraction of air, the density of air, and the optical path length. Since the index of refraction changes with wavelength, the average density, and hence, index of refraction can be deduced by measuring the optical path length at two or more wavelengths.

Measurement systems based on measuring the optical path length at two widely separated frequencies are known to the art. For example, Lis (U.S. Pat. No. 5,404,222) describes a system in which two lasers are utilized to measure the optical path length at different frequencies. The system taught by Lis requires a much more complex optical system than that utilized in a conventional AC interferometer. This system requires 3 wavelengths, and multiple distance measurements to correct for air turbulence. In addition, the system has a poor signal-to-noise ratio because it relies on non-resonant second harmonic generation to provide the multiple wavelengths. The system also relies on expensive optical techniques to generate a correction signal.

Broadly, it is the object of the present invention to provide an improved AC interferometer.

It is a further object of the present invention to provide an interferometer that automatically compensates for turbulence along the measured optical path.

It is a still further object of the present invention to provide an interferometer that is less complex than prior art interferometers that compensate for turbulence.

These and other objects of the present invention will become apparent to those skilled in the art from the following detailed description of the invention and the accompanying drawings.

SUMMARY OF THE INVENTION

The present invention is an apparatus for measuring the change in position of a stage mirror with reference to a reference mirror when the stage mirror moves between first and second positions. The apparatus includes a light source for generating first and second coincident light beams, the first light beam having a wavelength $\lambda_1$ and the second light beam having a wavelength $\lambda_2$ where $\lambda_1 = M\lambda_2$. The first light beam includes two orthogonally polarized components differing in frequency by a first beat frequency, $F_{ref}(\lambda_1)$, and the second light beam includes two orthogonally polarized components differing in frequency by a second beat frequency, $F_{ref}(\lambda_2)$, where $F_{ref}(\lambda_2) = M \, F_{ref}(\lambda_1)$, and M is an integer greater than 1. A polarization dependent beam splitter directs one of the orthogonally polarized components of each of the light beams to the reference mirror and the other of the orthogonally polarized components of each of the light beams to the stage mirror. The polarization dependent beam splitter also recombines the orthogonally polarized components after the orthogonally polarized components have been reflected by either the reference mirror or the stage mirror. A first detector measures the intensity of light in the first light beam after the orthogonally polarized components of the first light beam have been recombined by the polarization dependent beam splitter to generate a first detector signal having a magnitude equal to the light intensity at the first detector, the first detector signal oscillating at an instantaneous frequency of $F_1(t)$. A second measures the intensity of light in the second light beam after the orthogonally polarized components of the second light beam have been recombined by the polarization dependent beam splitter. The second detector generating a second detector signal having a magnitude equal to the light intensity at the second detector, the second detector signal oscillating at an instantaneous frequency of $F_2(t)$. A reference signal generator generates a reference signal that oscillates at $F_{ref}(\lambda_1)$. An optical path measurement circuit measures the difference in the number of oscillations of the second detector signal and the reference signal generator during the period in which the stage mirror moves from the first position to the second position. A correction term circuit measures the number of oscillations in a signal having an instantaneous frequency equal to $MF_1(t)-F_2(t)$ during the period in which the stage mirror moves from the first position to the second position. In the preferred embodiment of the present invention, M=2.

DETAILED DESCRIPTION OF THE INVENTION

Figure 1:
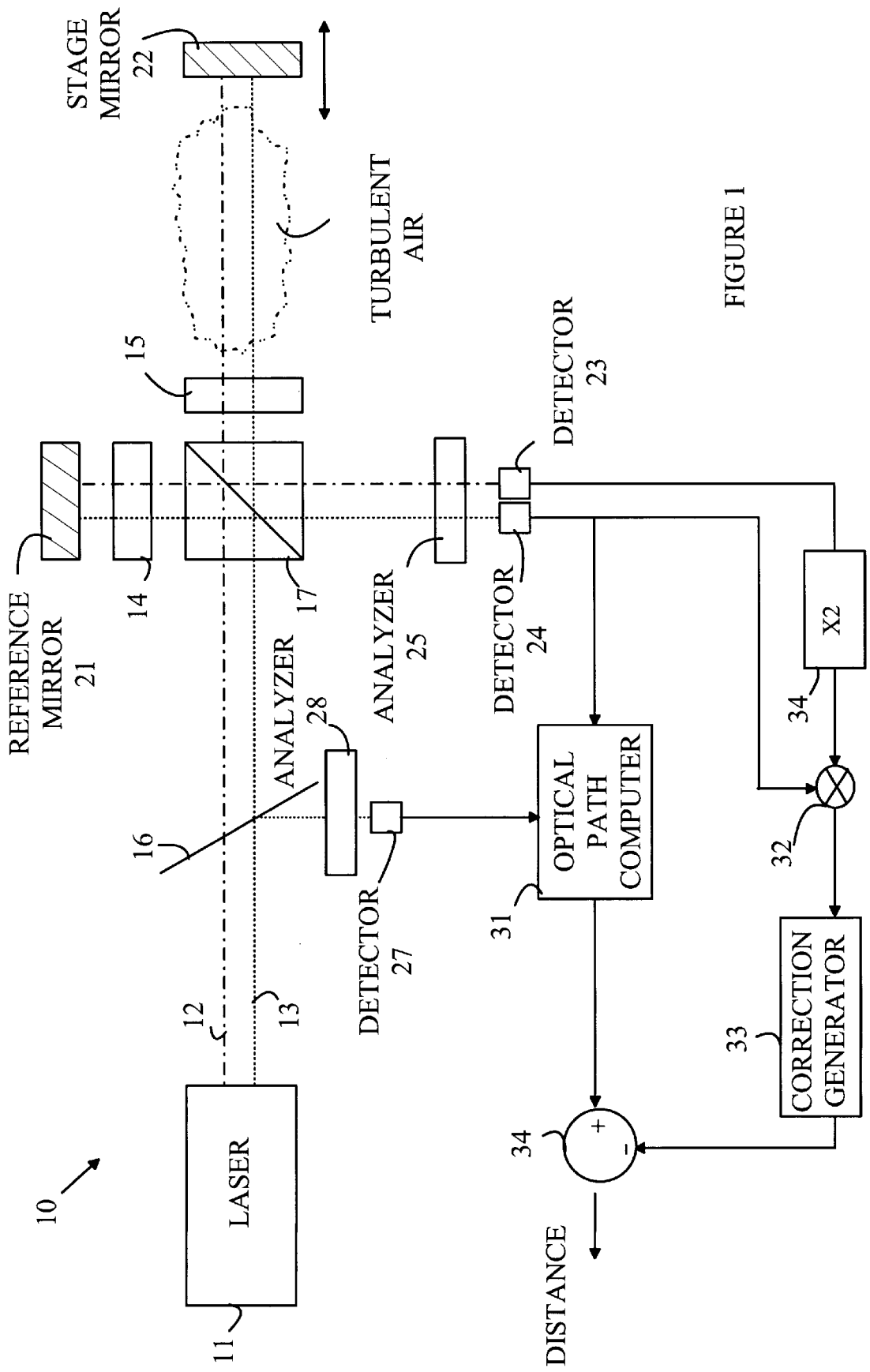
FIG. 1 is a block diagram of a laser interferometer according to the present invention.

Refer now to FIG. 1, which is a block diagram of a laser interferometer 10 according to the present invention for measuring the difference in distance between a reference mirror 21 and a movable mirror 22. Light source 11 generates two orthogonally polarized split-frequency waves at 2 wavelengths, $\lambda_1$ and $\lambda_2=\lambda_1/2$. The waves are shown as two separate beams to simplify the drawing, however, it is to be understood that the two beams are coincident in space. The beam at $\lambda_1$ is shown at 12 and the beam at $\lambda_2$ is shown at 13. Each beam is composed of the two orthogonally polarized components that differ in frequency by 5–10 MHz. The optimal frequency difference is determined by the maximum speed at which the stage travels. A laser having the required properties is described in U.S. Pat. No. 5,732,095, which is hereby incorporated by reference.

Each beam is split by polarization beam splitter 17 such that one component is directed to reference mirror 21 and the other component is directed to stage mirror 22. A quarter wave plate 14 provides a 90° rotation of the polarization of the components that are reflected from reference mirror. Hence, on returning to beam splitter 17, these components pass through the beam splitter and reach detectors 23 and 24 via polarization analyzer 25. Analyzer 25 generates a beat signal from the orthogonally polarized beams coming from the reference and measurement mirrors. It is oriented at 45° to the polarization directions of these beams. Similarly, a quarter wave plate 15 provides a 90° rotation of the polarization of the components that pass through beam splitter 17 and are reflected from stage mirror 22. Hence, on returning to beam splitter 17, these components are also reflected into detectors 23 and 24. Detector 23 has an appropriate filter to limit its detection to the light in the frequencies in beam 12, and detector 24 has a filter to limit its detection to the light of the frequencies in beam 13.

A third detector 27 and a second analyzer 28 generate a reference signal from the output of light source 11 at $\lambda_2$. A non-polarizing beam splitter 16 is used to divert a portion of the laser output to detector 27 which has a filter that blocks light of wavelength $\lambda_1$.

For the purposes of this discussion, it will be assumed that the two components of the beam having wavelength $\lambda_1$ differ by 10 MHz and that M=2, i.e., $\lambda_1=2\lambda_2$. Hence, the output of detector 27 will have a beat frequency of 10 MHz and is determined solely by the splitting in the laser line. The beat frequency generated by detector 24 will be Doppler shifted relative to this reference frequency by an amount that depends on the speed at which the stage is traveling.

The difference in frequency between the components of the beam at $\lambda_2$ is determined by the difference at $\lambda_1$. Hence, in the present example, the output of detector 23 will have a beat frequency of 20 MHz Doppler shifted by an amount that depends on the speed at which the stage is traveling.

The present invention is based on the observation that the optical path length, $P_{AB}(\lambda)$, corresponding to the mirror moving from position A to position B is related to distance $L_{AB}$ moved by the mirror and the index of refraction of air at the measurement wavelength by the following formula:

$$P_{AB}(\lambda) = L_{AB} + \int_A^B [n(\lambda) - 1] dx \qquad (1)$$

where $n(\lambda)$ is the index of refraction of air at $\lambda$. Applying Eq. (1) at the two frequencies and solving for $L_{AB}$, $$L_{AB} = P_{AB}(\lambda_2) - \frac{\alpha_2[P_{AB}(\lambda_1) - P_{AB}(\lambda_2)]}{\alpha_1 - \alpha_2} \qquad (2)$$

where $$\alpha_i = \frac{n(\lambda_i) - 1}{\rho} \qquad (3)$$

for i=1, 2. Here, $\rho$ is the density of air. It should be noted that the Eq. (2) does not depend on $\rho$; hence, the distance computed from Eq. (2) is corrected for any turbulence.

For AC interferometric measurements, the optical path length is related to the frequency difference of the two polarized states at the beam frequency Doppler shifted by the instantaneous stage speed at time. In particular, $$P_{AB}(\lambda) = \frac{\lambda}{4\pi} \int_A^B [F_\lambda(t) - F_{ref}(\lambda)] dt \qquad (4)$$

where, $F_\lambda(t)$ is the beat frequency measured at time, t, by the detector tuned to detect wavelength $\lambda$, and $F_{ref}(\lambda)$ is the reference beat frequency at wavelength $\lambda$, i.e., the beat frequency when the stage is not moving. As noted above, $\lambda_1=2\lambda_2$ and $F_{ref}(\lambda_2)=2F_{ref}(\lambda_1)$. Hence, $$P_{AB}(\lambda_1) - P_{AB}(\lambda_2) = \frac{\lambda_2}{4\pi} \int_A^B [2F_{\lambda_1}(t) - F_{\lambda_2}(t)] dt \qquad (5)$$

It should be noted that the integral is merely the count accumulated by a counter whose input is the difference between twice the lower beat frequency and the higher beat frequency during the time the stage moves from position A to position B. In the preferred embodiment of the present invention, this difference is generated using a frequency doubling circuit 34 to double the beat frequency from detector 23 and a mixer 32 to form the difference of the doubled beat frequency and the beat frequency measured by detector 24. The resultant difference signal is integrated by correction generator 33, which also multiplies the correction by $$\Gamma = \frac{\alpha_2}{\alpha_1 - \alpha_2} \quad (6)$$

The optical path at $\lambda_2$ is generated by circuit 31 which accumulates the difference between the beat frequency from detector 24 and the reference frequency from detector 27 during the period in which the stage moves from position A to position B. The accumulated difference is multiplied by $\lambda_2/4\pi$ to generate the optical path measurement, $P_{AB}(\lambda_2)$. Subtractor 34 provides the corrected distance measurement by computing the difference between the optical path measurement and the correction term.

The above-described embodiments of the present invention have utilized two beams that differ in frequency by a factor of two. However, it will be obvious to those skilled in the art from the preceding discussion that the present invention may be practiced with two beams that differ in frequency by any integer factor.

The above-described embodiments of the present invention have also utilized specific circuitry for computing the difference of the beat frequencies. However, it will be obvious to those skilled in the art from the preceding discussion that other circuits could be utilized without departing from the teachings of the present invention. For example, the individual beat frequencies can be separately integrated over the movement of the stage and the correction term determined from the accumulated differences.

Various modifications to the present invention will become apparent to those skilled in the art from the foregoing description and accompanying drawings. Accordingly, the present invention is to be limited solely by the scope of the following claims.

What is claimed is:

1. A apparatus for measuring the change in position of a stage mirror with reference to a reference mirror when said stage mirror moves between first and second positions, said apparatus comprising:

a light source for generating first and second coincident light beams, said first light beam having a wavelength $\lambda_1$ and said second light beam having a wavelength $\lambda_2$ where $\lambda_1 = M\lambda_2$, said first light beam comprising two orthogonally polarized components differing in frequency by a first beat frequency, $F_{ref}(\lambda_1)$ and said second light beam comprising two orthogonally polarized components differing in frequency by a second beat frequency, $F_{ref}(\lambda_2)$, where $F_{ref}(\lambda_2) = M F_{ref}(\lambda_1)$, M being an integer greater than 1;

a polarization dependent beam splitter for directing one of said orthogonally polarized components of each of said light beams to said reference mirror and the other of said orthogonally polarized components of each of said light beams to said stage mirror and for recombining said orthogonally polarized components after said orthogonally polarized components have been reflected by either said reference mirror or said stage mirror;

a first detector for detecting the intensity of light in said first light beam after said orthogonally polarized components of said first light beam have been recombined by said polarization dependent beam splitter, said first detector generating a first detector signal having a magnitude equal to the light intensity at said first detector, said first detector signal oscillating at an instantaneous frequency of $F_1(t)$;

a second detector for detecting the intensity of light in said second light beam after said orthogonally polarized components of said second light beam have been recombined by said polarization dependent beam splitter, said second detector generating a second detector signal having a magnitude equal to the light intensity at said second detector, said second detector signal oscillating at an instantaneous frequency of $F_2(t)$;

a reference signal generator for generating a reference signal that oscillates at said second beat frequency;

an optical path measurement circuit for measuring the difference in the number of oscillations of said second detector signal and said reference signal generator during the period in which said stage mirror moves from said first position to said second position and for generating an optical path signal indicative of said difference; and a correction term circuit for measuring the number of oscillations in a signal comprising $MF_1(t)-F_2(t)$ during the period in which said stage mirror moves from said first position to said second position and for generating a correction signal indicative of said measured number of oscillations.

2. The apparatus of claim 1 further comprising a circuit for forming a linear weighted difference of said optical path signal and said correction signal.

3. The apparatus of claim 1 wherein said correction term circuit comprises a frequency multiplying circuit for generating a signal having M times the frequency of said first detector signal and a mixer for subtracting said generated signal from said second detector signal.

4. The apparatus of claim 1 wherein M=2.

5. The apparatus of claim 1 wherein said reference signal generator comprises a beam splitter for directing a portion of said second light beam onto a light detector that generates said reference signal.

* * * * *